United States Patent [19]

Kawahara et al.

[11] Patent Number: 4,489,393
[45] Date of Patent: Dec. 18, 1984

[54] MONOLITHIC DISCRETE-TIME DIGITAL CONVOLUTION CIRCUIT

[75] Inventors: Steven K. Kawahara, Hermosa Beach; James G. Peterson, Manhattan Beach, both of Calif.

[73] Assignee: TRW Inc., Redondo Beach, Calif.

[21] Appl. No.: 326,789

[22] Filed: Dec. 2, 1981

[51] Int. Cl.³ .................................................. G06F 7/38
[52] U.S. Cl. ...................................... 364/728; 364/758; 364/754; 364/768
[58] Field of Search ............... 364/728, 754, 756, 757, 364/758, 768, 783, 784, 785, 786, 787, 788

[56] References Cited

U.S. PATENT DOCUMENTS

| | | | |
|---|---|---|---|
| 3,463,911 | 3/1966 | Dupraz et al. | 12/176 |
| 3,761,698 | 9/1973 | Stephenson | 235/164 |
| 3,774,019 | 11/1973 | Cook | 235/181 |
| 3,801,883 | 4/1974 | Tiemann | 317/235 |
| 3,980,873 | 9/1976 | Mattei | 235/156 |
| 4,025,772 | 5/1977 | Constant | 235/156 |
| 4,063,082 | 12/1977 | Nussbaumer | 364/728 |
| 4,097,844 | 6/1978 | Moyer | 340/146.2 |
| 4,224,679 | 9/1980 | Nossen et al. | 364/728 |
| 4,267,580 | 5/1981 | Bond et al. | 364/824 |
| 4,369,500 | 1/1983 | Fette | 364/758 |

OTHER PUBLICATIONS

Electronics, Larry Waller, Convolver on a Chip Pipelines Its Work, 12/4/80, pp. 44, 47.
IEEE Transactions on Computers, Cornelia I. Toma, Cellular Logic Array for High-Speed Signed Binary Number Multiplication, 9/75, pp. 932-935.
Steven K. Kawahara et al., "A One-Micron Bipolar VLSI Convolver," 1981 IEEE International Solid-State Circuits Conf., Digest of Tech. Papers, pp. 226-227.

Primary Examiner—Jerry Smith
Assistant Examiner—Karl Huang
Attorney, Agent, or Firm—Noel F. Heal; Robert M. Wallace; Robert W. Keller

[57] ABSTRACT

A monolithic convolver circuit making extensive use of "pipelined" architecture to ensure high speed by concurrency of processing, and having a repetitive stage to facilitate chip layout and manufacture. The circuit includes a multiplier and an adder in each stage. The adders produce a sequence of summation terms concurrently and include shift registers to move and accumulate the results of convolution. The adders produce only partial sums at each stage, to increase processing speed. Full computation of carries is deferred until the very end, and performed in a separate conditional sum adder.

16 Claims, 7 Drawing Figures

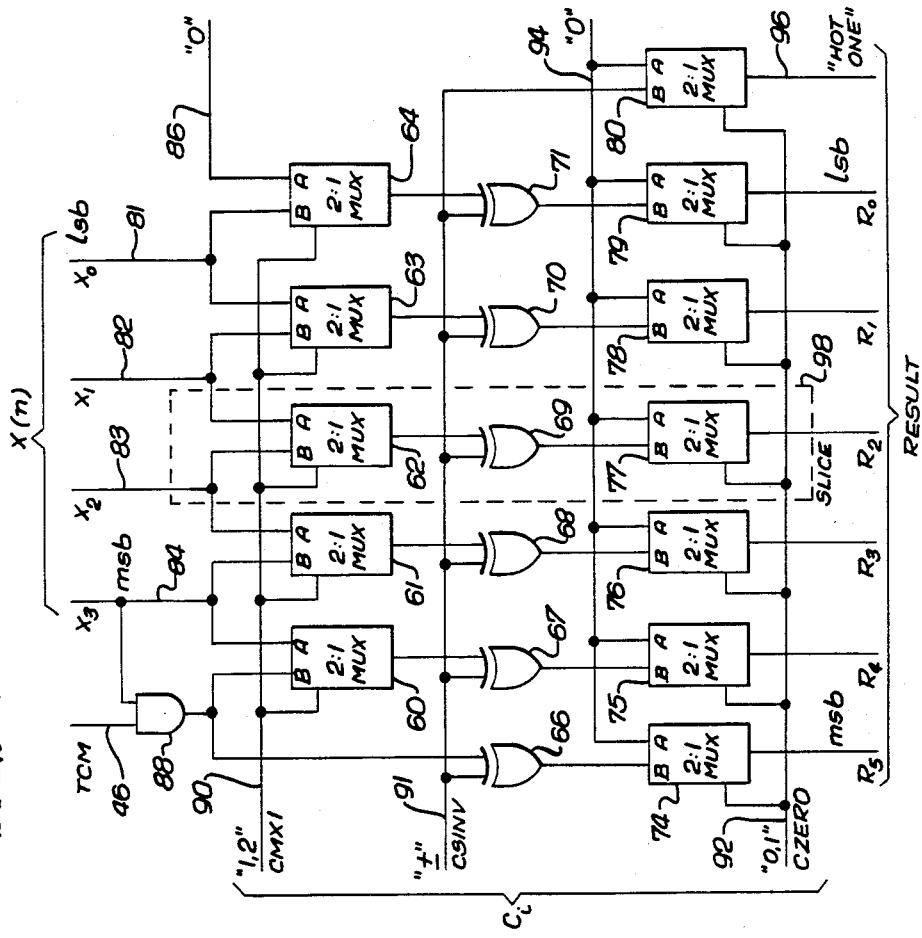
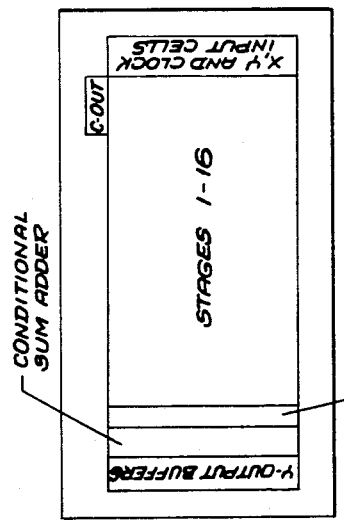

MONOLITHIC DISCRETE-TIME DIGITAL CONVOLUTION CIRCUIT

BACKGROUND OF THE INVENTION

The present invention relates generally to circuitry for performing a convolution function, and, more particularly, to convolution circuitry employing digital samples of two input functions taken at discrete time intervals.

Convolution may be expressed as a mathematical relationship combining two time-varying functions. Convolution is used extensively in the signal processing and communications fields, for example in high-speed digital finite-impulse-response filters, and in pulse compression and detection techniques. For two continuous time-varying functions x(t) and c(t), the convolution of the two functions is given by the expression:

$$c(t)*x(t) = \int_{-\infty}^{\infty} c(\tau)x(t-\tau)d\tau \qquad (1)$$

where the symbol $\tau$ represents an independent time variable.

This expression may have little more than an abstract meaning to those outside the communications field, and the physical meaning of convolution can be more readily understood by means of a graphical representation. For example, an explanation along these lines is provided in a book by B. P. Lathi, "Signals, Systems and Communication," published by John Wiley & Sons, Inc., 1965. Basically, if the two input functions are plotted graphically, convolution can be visualized by folding one of the functions about the zero-time axis, and then translating it along the time axis with respect to the corresponding plot of the other function. At each relative position of the two plotted functions, the value of the convolution function is proportional to the sum of the products of corresponding ordinates on the two curves. If one of the curves is of unit height, the graphical representation simplifies further to one of determining areas under the other curve as one curve is translated with respect to the other.

When the time-varying functions to be convolved are represented by samples taken at discrete time intervals, the corresponding expression for the convolution function is:

$$y(n) = \sum_{i=0}^{N-1} x(n-i) \cdot c(i) \qquad (2)$$

Although many convolution circuits have been suggested in the past, no fully digital circuit has been successfully implemented in monolithic form. Design complexity is among the reasons usually given for lack of success in this area. The inherent advantages of integrated circuitry, including higher speed, lower power and potentially lower cost, have still not resulted in the production of any monolithic convolvers prior to this invention. Accordingly, there has been a definite need for monolithic convolver circuit that is well suited to modern integrated-circuit fabrication techniques utilizing very large scale integration (VLSI). The present invention satisfies this need.

SUMMARY OF THE INVENTION

The present invention resides in a monolithic discrete-time digital convolution circuit that makes extensive use of concurrent execution of multiplication and addition functions to minimize computation time, and extensive use of a single repeated stage to facilitate manufacture in monolithic form. In addition, the use of adders that produce partial sums at each stage further increases the speed of the circuit.

Basically, and in general terms, the circuit of the invention includes a plurality (N) of storage circuits for holding N respective values of a first function, a like plurality (N) of multipliers each connected to yield the product of a respective one of the values of the first function multiplied by one of a succession of values of a second function that is supplied to all of the multipliers. The circuit also includes a chain of N adders, each coupled to receive corresponding output products from the multipliers, and each combining a multiplier product with a cumulative sum from a prior adder in the chain, and passing the result to the next adder in the chain. Successive values of the convolution of the first and second functions are computed in a concurrent manner by the arrangement of multipliers and adders, and are provided as the convolved result in the last adder in the chain.

An important aspect of the adder chain is that each stage of it computes only a partial sum, i.e. a set of sum bits computed without regard to carry bits, and a full set of carry bits, the partial sum and carry bits being temporarily stored for propagation to the next stage of the adder chain. A full set of partial sum bits and a full set of carry bits are finally presented to a conditional sum adder, for computation of the final result as data leaves the adder chain.

In accordance with another aspect of the invention, the storage circuits for holding N respective values of the first function are loaded in parallel from a serially loadable buffer register. The buffer register can then be loaded with a new set of values of the first function as soon as a prior set has been moved in parallel to the storage circuits.

It will be appreciated from this brief summary that the invention represents a significant advance in the field of convolution circuits. In particular, it provides a hitherto unavailable monolithic circuit for performing the convolution function in discrete form. Other aspects and advantages of the invention will become apparent from the following more detailed description, taken in conjunction with the accompanying drawings.

BRIEF DESCRIPTION OF THE DRAWINGS

FIG. 2 is a diagrammatic plan view showing the layout of an integrated-circuit chip embodying the invention;

FIG. 3 is a logic diagram of the multiplier used repeatedly in the circuit of FIG. 1;

FIG. 4 is a table showing the hybrid encoding logic used in association with the multiplier logic of FIG. 3;

DESCRIPTION OF THE PREFERRED EMBODIMENT

Figure 1:
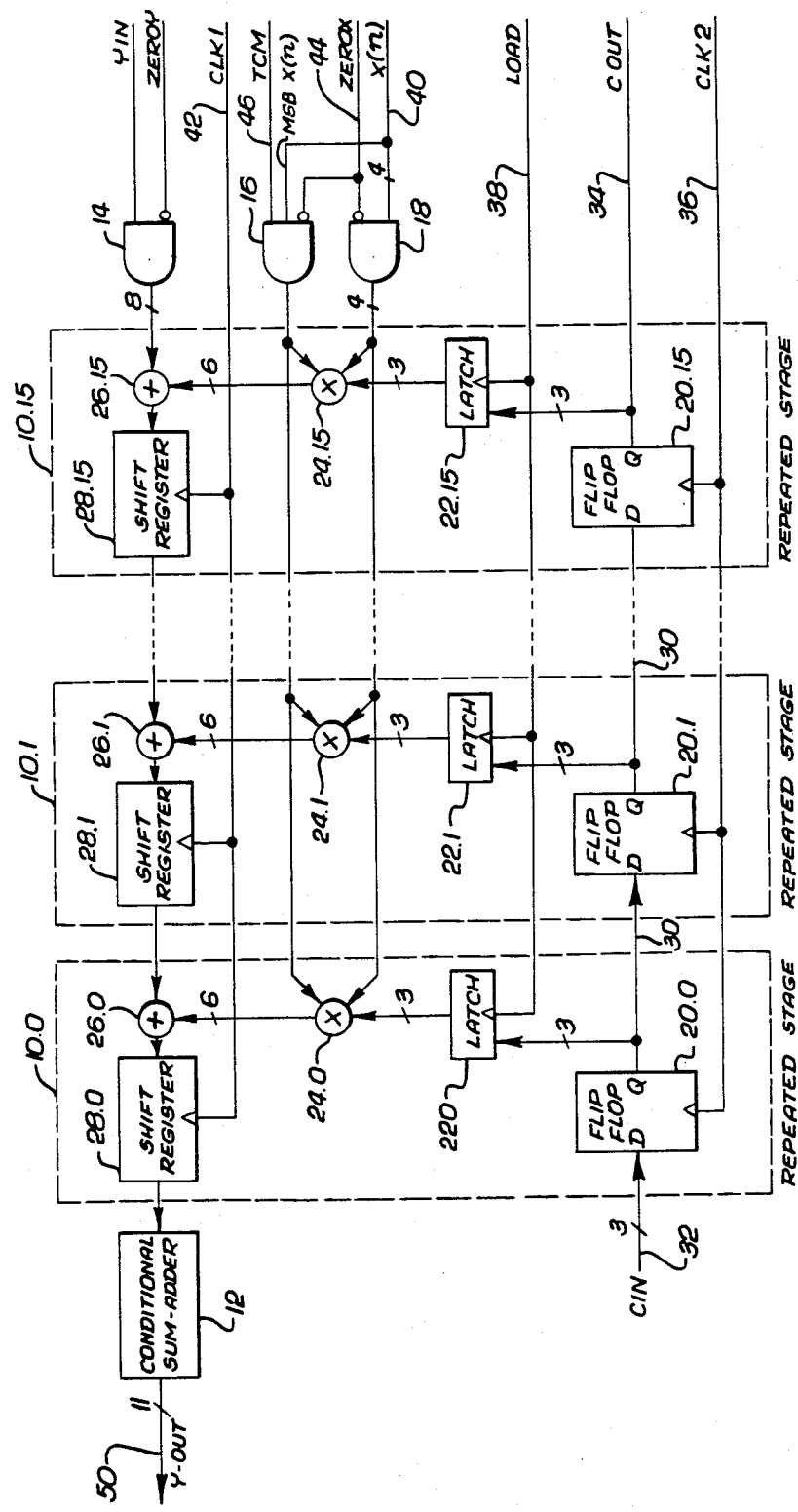
FIG. 1 is a block diagram of a 16-stage convolver circuit in accordance with the present invention.

As shown in the drawings for purposes of illustration, the present invention is principally concerned with convolver circuits, which, in the past, have been unsuitable for implementation in monolothic form. In accordance with the present invention, extensive use is made of concurrent processing of information, sometimes referred to as "pipelining," and the circuitry provides for the use of repeated stages, which are more conveniently formed in the fabrication of a monolithic device. To maximize computation speed, summation is performed using an array of adders that produce partial sum bits together with a set of carry bits, the partial sum bits and the carry bits being summed only at the end of the computation, in a conditional sum adder.

More specifically, the illustrative embodiment of the invention comprises sixteen repeated stages referred to by reference numerals 10.0–10.15. The only additional components shown in FIG. 1 are the conditional sum adder 12 and three AND gates 14, 16 and 18. Each of the repeated stages 10 includes a flip-flop 20, a latch 22, a multiplier 24, an adder 26, and a shift register 28. All of these items are referred to in FIG. 1 using reference numeral suffixes 0.0 through 0.15, consistent with the reference numerals for the repeated stages 10. Each of the flip-flops 20 is three bits wide and is connected to the flip-flops in the next stage by lines shown at 30. The first flip-flop 20.0 is provided with three input bits on line 32, and the Q output of the last flip-flop 20.15 is connected to line 34, which is referred to by the signal name COUT.

Sixteen three-bit quantities are input to the flip-flops 20 over line 32, as directed by a clocking signal on line 36, and are shifted serially through the flip-flops until the sixteen values are appropriately stored in corresponding flip-flops. The output of each flip-flop 20 is also connected as an input to a corresponding latch 22, and the digits stored in the flip-flops are transferred to the latches 22 upon the occurrence of an appropriate clocking signal on a line 38. This line is designated by the signal name LOAD. The values stored in the latches 22 are sixteen samples of a function c(n), which is one of two functions of which the convolution is required. The other input signals x(n) are shown as being supplied over line 40, which is four bits in width and is shown as connected as an input to AND gate 18. The output of the AND gate 18, which is also four bits wide, is connected as one input to each one of the multipliers 24. A succession of values x(n) is supplied over line 40 and applied to the multipliers in synchronism with a clocking signal on line 42.

The other inputs to the multipliers 24 are the values from the respective latches 22, which are each three bits in width. The other input to AND gate 18 is from line 44, designated by the signal name ZEROX, the purpose of which is to apply zero values to the multipliers 24 for initialization purposes. The ZEROX signal on line 44 and the most significant bit of the x(n) value on line 40 are also applied as inputs to AND gate 16, a third input of which is supplied over line 46, designated TCM. The purpose of this line is to indicate to the convolver circuitry whether it should operate in accordance with a two's-complement mode or whether an unsigned integer mode of operation is required. For two's-complement operation, AND gate 16 generates a "one" bit of output to be applied as a control signal to each of the multipliers 24. Operation in this mode will be explained in more detail below.

The outputs of the multipliers are connected as inputs to the corresponding adders 26. In simple terms, each of the adders 26 combines a multiplier product with an accumulated sum and carry received from an adjacent adder. Thus, the sum generated by adder 26.1 is stored temporarily in shift register 28.1, and subsequently is transferred to the next adder in sequence 26.0. In adder 26.0 the accumulated sum is combined additively with the multiplier product from multiplier 24.0 and the accumulated carry from adder 26.1. The output of shift register 28.0 passes to the conditional sum adder 12, since the adders 26 and shift registers 28 do not produce a final sum, but rather produce a partial sum and a set of carry bits. The conditional sum adder 12 adds the partial sum bits and the carry bits to produce the final result on line 50, designated by the signal name YOUT.

To understand how the convolver circuit operates, coonsider again the expression for discrete convolution:

$$y(n) = \sum_{i=0}^{N-1} x(n-i) \cdot c(i) \qquad (2)$$

From this expression,
  $y(0) = x(0).c(0)$
  $y(1) = x(1).c(0) + x(0).c(1)$
  $y(2) = x(2).c(0) + x(1).c(1) + x(0).c(2)$

.
.
.

$y(15) = x(15).c(0) + x(14).c(1) + \ldots + x(0).c(15)$

In the first cycle of operation on the convolver circuit in FIG. 1, the expression for y(0) will be computed in multiplier 24.0 and adder 26.0, and subsequently shifted out of the shift register 28.0. All of the component products having x(0) as a multiplicand will also be computed in this cycle by the other multipliers 24. For example, x(0).c(1) will be computed in multiplier 24.1 and stored in shift register 28.1. On the next cycle, x(1).c(0) will be computed in multiplier 24.0 then will be added to the product x(0).c(1) in adder 26.0 and will subsequently be output to the conditional sum adder 12. Computation of y(15), the convolution value with the largest number of component products, is initiated in multiplier 24.15 and adder 26.15, where the product x(0).c(15) is first computed. Additional component products are added to the cumulative sum of y(15) as it progresses along the repeated stages of the adders 26 and shift registers 28. The final component x(15).c(0) is added in adder 26.0, just before the total is output to the conditional sum adder 12. Thus, it will be seen that computation of the convolution values results proceeds as nearly concurrently as possible.

FIGS. 3 and 4 illustrate how hybrid encoding of the value c(n) is used to achieve a fast multiplier operation in the multipliers 24. Each of the multipliers includes a first stage comprising five two-to-one multiplexers 60–64, a second stage comprising six exclusive OR gate 66–71, and a first stage comprising seven additional two-to-one multiplexers 74–80. The x(n) signal lines are indicated at 81–84, and each line is connected to two of the multiplexers 60–64, in the following manner. The least significant bit on line 81 is connected to the B input of multiplexers 64 and to the A input of multiplexers 63; line 82 is connected to the B input of multiplexer 63 and to the A input of multiplexes 62, line 83 is connected to the B input of multiplexer 62 and to the A input of multiplexer 61, and the most significant bit on line 84 is connected to the B input of multiplexer 61 and to the A input of multiplexes 60. The A input of multiplexer 64 is permanently supplied with a zero logic input level, as indicated at 86. The two's-complement mode bit on line 46, is connected as one input to an AND gate 88, which is logically equivalent to the AND gate 16 in FIG. 1. The other input to AND gate 88 is derived from the most significant bit line 84. The output of AND gate 88 is connected both to the B input of multiplexer 60 and to one input of exclusive OR gate 66 in the second stage of the multiplier.

The three c(n) input lines are indicated at 90, 91 and 92 in FIG. 3. Line 90 carries a signal designation CMX1, line 91 carries the signal designation CSINV, and line 92 carries the signal designation CZERO. The significance of these signal names will be explained in relation to FIG. 4. The CMX1 signal on line 90 is connected to the control signal input to each of the multiplexers 60–64. The CSINV line on 91 is connected as a second input to each of the exclusive OR gates 66–71 and as a B input to multiplexer 80 in the third stage of the multiplier. Finally, the CZERO line 92 is connected as a control input to each of the multiplexers 74–80 in the third stage. To complete the connections of the three stages, the outputs of multiplexers 60–64 in the first stage are connected as inputs to exclusive OR gates 67–71, respectively. The outputs of multiplexers 74–79 are, as will be explained, the multiplier result lines, the output from multiplexer 79 being the least significant bit and the output from multiplexer 74 the most significant bit.

Before turning to an explanation of the operation of the multiplier logic, the method of encoding the values of c(n) needs to be explained with reference to FIG. 4. In the exemplary convolver circuit disclosed in this application, the value of c(n) can take any of five states, including $+2$, $+1$, 0, $-1$, and $-2$. To improve the speed of multiplication, these are coded in the hybrid format indicated in FIG. 4. If the c value has a magnitude of 1, whether positive or negative, then the first signal CMX1 on line 90 is at a logical one level; otherwise it is at a logical zero level. If the c signal value is negative, the signal CSINV on line 91 has a logical value of one, and otherwise has a value of zero. Finally, if the c value is zero the signal CZERO on line 92 has a logical level of one; otherwise it has a logical zero level.

The purpose of the first level of the multiplier, controlled by the signal CMX1 on line 90, is to multiply the incoming x(n) signal by two if the corresponding c value is a 2, either positive or negative. The purpose of the second stage of the multiplier is to reverse the sign of the product developed by the multiplier. Finally, if the c value is zero, the entire product is replaced by zeros, as indicated by the zero signal level on line 94, which is connected to all of the A inputs of the multiplexers 74–80.

It will be seen from an examination of the first stage of the multiplier that if the CMX1 signal on line 90 is a one, indicating that the c value is $+1$ or $-1$, the B inputs of the multiplexers 60–64 are selected. Thus, the values on the x(n) input lines 81–84 are passed through to the outputs of multiplexers 64, 63, 62 and 61, respectively. On the other hand, if the value of CMX1 is a zero, indicating that the c value is $+2$ or $-2$, the x(n) values on lines 81–84 are passed through to the outputs of multiplexers 63, 62, 61 and 60, respectively. In addition, a zero is inserted after the least significant bit, in multiplexer 64. Thus, a left shift of one binary digit is accomplished, multiplying the x(n) value by two. In the second multiplier stage, the exclusive OR gates 66–71 accomplish inversion of the signal if the control signal on line 91 is a one. Finally, in the last multiplier stage, if a zero c(n) value is being processed the output signals are replaced by zeros in the multiplexers 74–80.

As mentioned earlier, the multiplier operates either in integer mode or in two's-complement mode. First, in integer mode the TCM signal on line 46 will be zero and the output of AND gate 88 will also be zero. Thus, the leading digit output from multiplexer 60 will be a zero if no doubling of the input signal was required, and will be equal in value to the most significant bit one line 84 if doubling was required. This leading digit will be transmitted through exclusive OR gate 67 and through multiplexer 75. The leading digits which may be derived from the TCM signal, will be inverted in exclusive OR gates 66 and 67 if sign reversal is called for.

In two's-complement mode, the most significant x(n) bit, on line 84, will be coupled through AND gate 88 and presented both to the B input of multiplexer 60 and as an input of exclusive OR gate 66. This most significant bit will be either a one or a zero, depending upon the sign of the two's-complement integer contained in the x(n) bits presented to the multiplier. In any event, the sign bit is appropriately generated at the most significant end of the product formed in the multiplier. The output 96 of the additional multiplexer 80 in the third stage of the multiplier is referred to as the "hot one" and is significant only if inversion of the product is called for in the second stage of the multiplier. If the CSINV signal on line 91 is a one, this one level is applied to the B input of multiplexer 80 and appears at the output on line 96 for non-zero values of c(n). Computing the reverse sign value of a number in two's-complement arithmetic involves inverting the value of each bit and then adding one bit to the least significant digit. This one bit is commonly known as the "hot one". It should logically be added to the least significant bit of the multiplier result presented from the output multiplexer 79. However, the addition is more conveniently and quickly performed in the adder logic to be described next It will be seen that a modular "slice" of the multiplier, indicated at 98, can be repeated throughout the multiplier, to facilitate fabrication in monolithic form.

Figure 5:
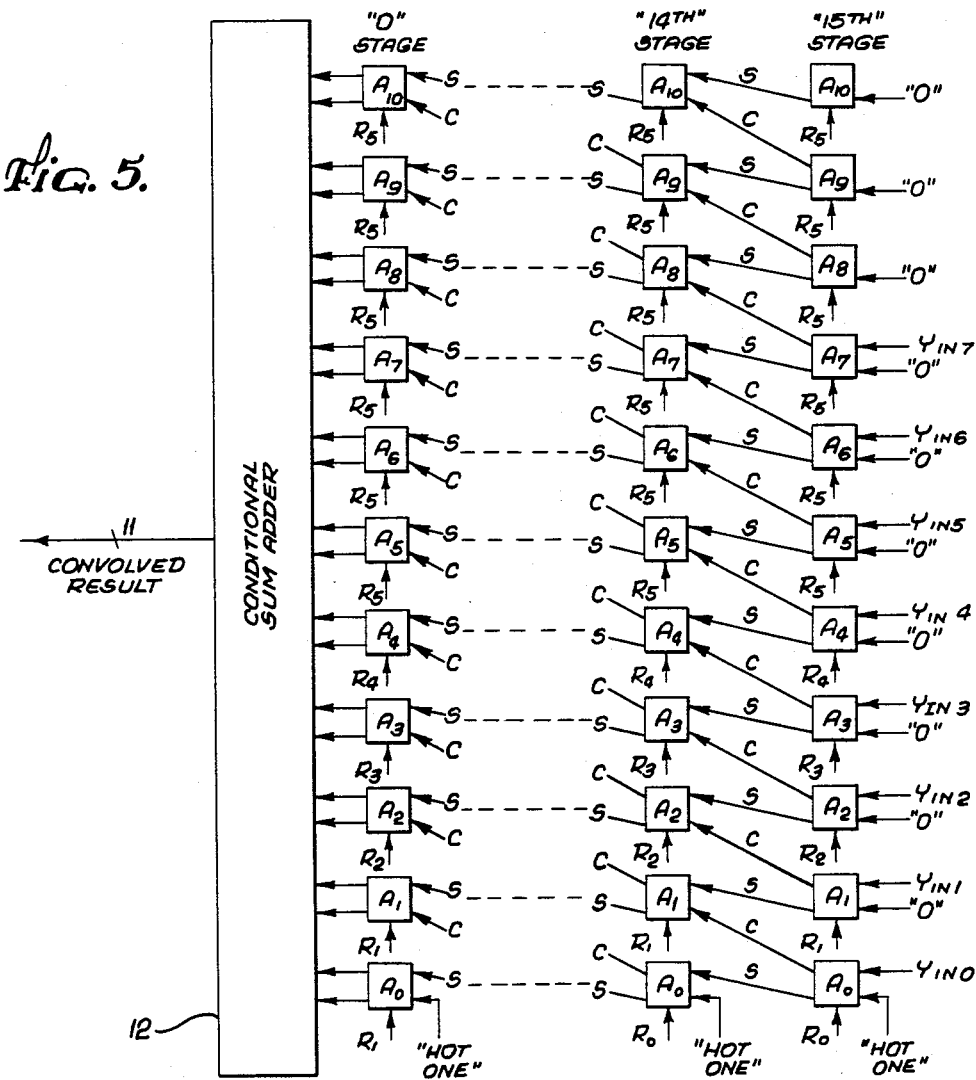
FIG. 5 is a block diagram showing the arrangement of adder modules used in the circuit of FIG. 1.
Figure 6:
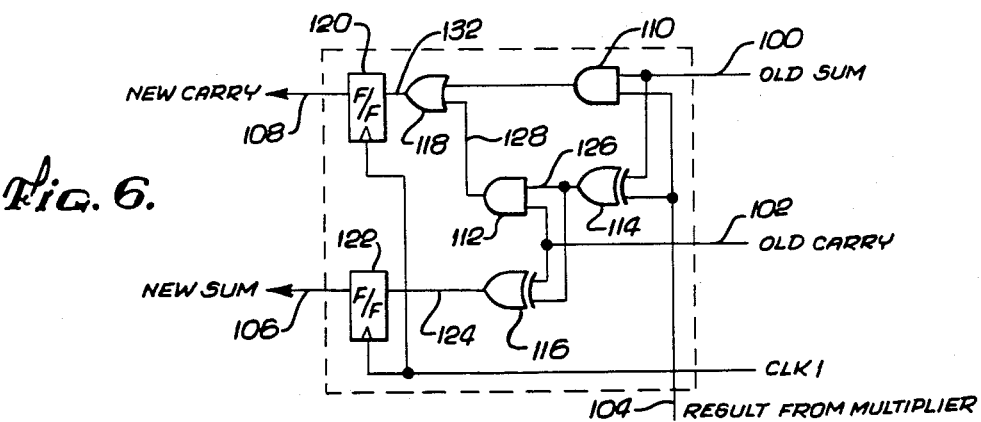
FIG. 6 is a logic diagram of an adder module used in each element of the diagram of FIG. 5.

Each adder 26 and shift register 28 comprises eleven one-bit adder modules as indicated by the boxes labeled $A_0$–$A_{10}$ in the right-hand column of FIG. 5. For consistency with the other figures, this is referred to as the "15th" stage of the adder array. Similarly, each of the other fifteen stages of the convolver circuit has eleven one-bit adder modules. Also shown in FIG. 5 are the eleven adder modules for the 14th stage and eleven for the zero stage. Each one-bit adder module is as shown in FIG. 6, to be described, and includes an input line 100 for the "old sum" value, an input line 102 for the "old carry" value, and an input line 104 for one bit of a new value to be added to the old sum and carry. The adder module provides two outputs, a "new sum" output on line 106 and a "new carry" output on line 108.

In the 15th stage shown in FIG. 5, the "old sum" and "old carry" inputs are not fully utilized, since there will be no carries from a preceding stage. The "old sum" inputs to adder modules $A_0$ through $A_7$ are used to input an eight-bit y input value, which may be utilized when two or more convolver circuits are coupled together.

The additional input lines 104 in adder modules $A_0$–$A_5$ are used to input the result from the multiplier 24.15. The least significant bit of the multiplier product is input to adder module $A_0$, the next most significant bit to adder module $A_1$, and so forth. The "old carry" input bit of the $A_0$ adder in each stage is used to input the "hot one" from the multiplier in each stage. The new sum output from adder $A_0$ in the 15th stage is connected to the old sum input of adder module $A_0$ in the 14th stage. Likewise, the new sum outputs from each of the other adder modules $A_1$–$A_{10}$ is coupled to the old sum input of the correspondingly numbered adders in the next or 14th stage. The new carry output from adder module $A_0$ in the 15th stage is coupled to the old carry input of $A_1$ adder in the 14th stage, this being the next most significant bit. Likewise, the new carry signals from each of the adders $A_1$–$A_9$ are coupled to the old carry inputs of adder modules $A_2$–$A_{10}$, respectively, in the 14th stage. The same manner of connection is carried across all 16 stages of the adder array until the zero stage is reached. At this point, the shift registers of the adders $A_0$–$A_{10}$ contain an eleven-bit accumulated partial sum and eleven bits of carry information.

It will be appreciated that the formation of partial sums in each of the 16 stages represents a considerable savings in time, but without any loss of information. All that remains to be done to produce the convolution function values for the result is to add the eleven-bits of partial sum information to the eleven bits of carry information. This is effected in the conditional sum adder 12. Conditional sum adders have been known for some years and the one used here will not be described in detail. It utilizes the algorithm first described in a paper entitled "Conditional-Sum Addition Logic" by J. Sklansky published in the IRE Transactions on Electronic Computers, June, 1960, page 226. Basically, the conditional sum adder computes all possible sum and carry digits in each column. The Sklansky method allows the computation from this information of all of the possible sums and carry digits for each pair of columns, then all of the sums and carry digits for each group of four columns, then each group of eight columns and so forth until the entire sum is a known to a certainty. The time required to perform this operation is several times less than the time to perform a conventional addition operation with ripple carry generation from column to column.

The adder module used in each of the elements in the adder array shown in FIG. 5 is basically as shown in FIG. 6. Each adder module includes two AND gates 110 and 112, two exclusive OR gates 114 and 116, one OR gate 118, and two flip-flops 120 and 122. The "old sum" signal on line 100 and the result from the corresponding multiplier on line 104 are exclusive OR'd in gate 114, then the result is exclusive OR'd in gate 116 with the "old carry" signal 102. The result on line 124 is input to flip-flop 122 as the new sum signal. The output of exclusive OR gate 114, on line 126, is provided at one input to AND gate 112, the other input being the old carry signal from line 102. The output from AND gate 112, on line 128, is provided as one input to OR gate 118. The old sum on line 100 and the multiplier result on line 104 are AND'ed together in AND gate 110, and the result is applied over line 130 as the other input to OR gate 118, the output of which is applied over line 132 to the other flip-flop 120 which holds the new carry signal.

As shown in FIG. 2, the convolver circuit of FIG. 1 can be conveniently laid out on a single monolithic chip. The y output buffers and the conditional sum adder are conveniently positioned at one end of the chip, together with c input and reference cells. At the other end of the chip the x and y and clock input cells are located, and the repeated stages are located in the remaining mid regions of the chip. It will be appreciated that the repeated stages could easily be expanded in number from 16 to 32 without affecting the design criteria of the chip.

The convolver circuit is implemented in the form of current-mode logic (CML) using an advanced one-micron bipolar technology and a triple diffusion process. Transistor geometries include metal widths of 4 microns and minimum metal spacings of 1.0 micron. Spacing between N+ emitter regions and P type base regions was maintained at 1.75 micron, with a typical breakdown voltage of 12.5 volts.

Power consumption for the 16-stage circuit is 750 milliwatts and the chip size is 245×133 mil. To minimize chip area, ringless or unguarded transistors are used instead of ringed transistors. Although the ringless transistors have characteristics that reduce operating logic margins, they represent an area saving of about 32 percent. The 16-stage convolver circuit performs $0.96 \times 10^9$ operations per second, which corresponds to a functional throughput rate of $6.92 \times 10^{11}$ gate-Hz/cm².

Figure 7:
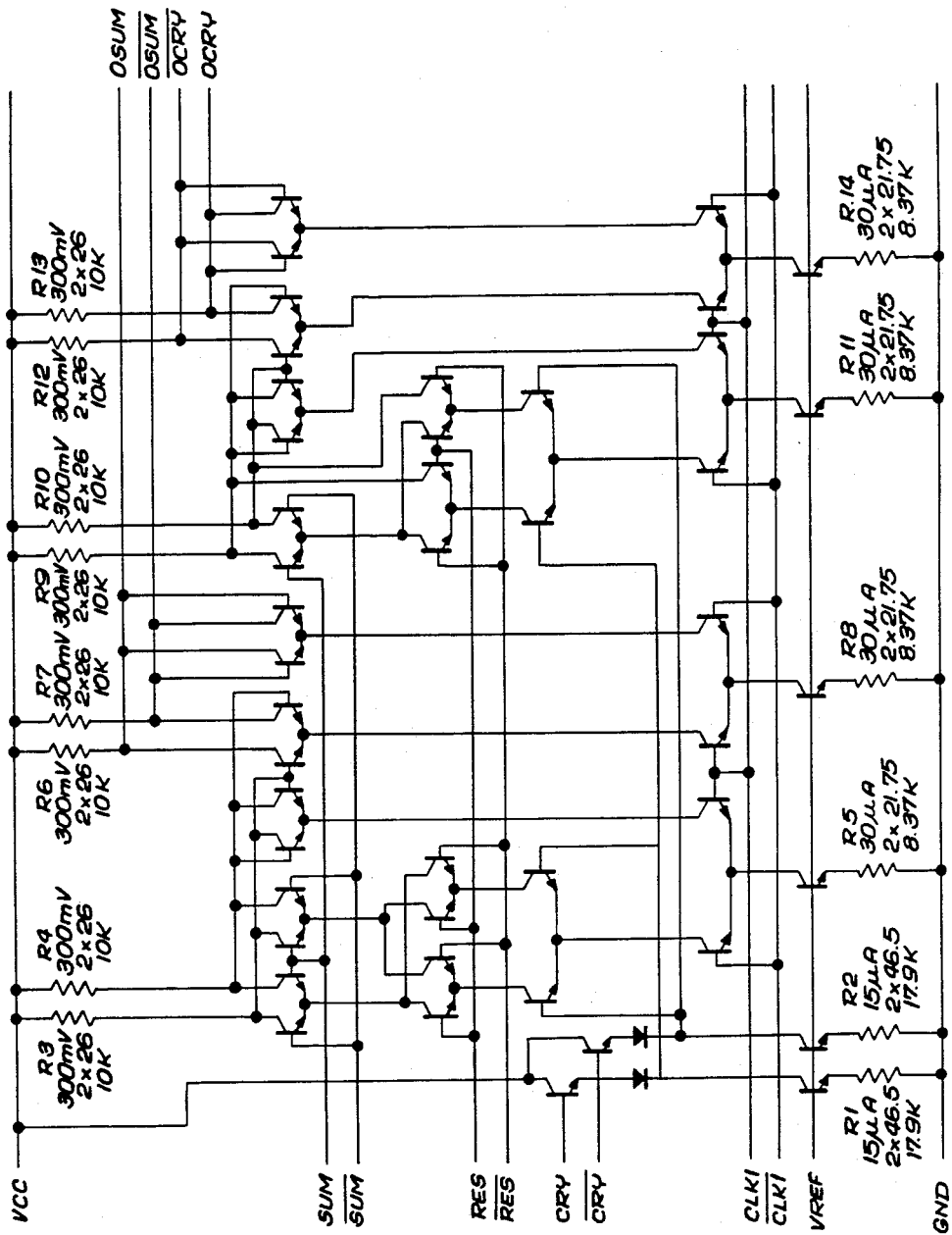
FIG. 7 is a detailed schematic of the adder module.

The CML circuitry of a single adder cell is shown by way of example in FIG. 7. CML is used for all internal circuitry of the chip, with conversion being made to TTL-compatible logic in the input and output circuits.

It will be appreciated from the foregoing description that the present invention represents a significant advance in the field of convolver circuits. In particular, the invention provides a monolithic convolver circuit utilizing to the greatest extent possible concurrent processing of information and use of repeated stages for efficient chip layout. Although a particular form of the invention has been described in detail for purposes of illustration, it will be appreciated that various modifications may be made without departing from the spirit and scope of the invention. Accordingly, the invention is not to be limited except as by the appended claims.

We claim:

1. A monolithic discrete-time digital convolution circuit, comprising:
   a pluralith (N) of storage circuits for holding N respective values of a first function;
   a like plurality (N) of multipliers having first inputs connected to respective ones of said storage circuits and second inputs connected together to receive N successive values of a second function, and providing output signals indicative of the products of the respective values of the first function and the successive values of the second function;
   a like plurality (N) of shift registers;
   a like plurality (N) of adders having first inputs connected to receive products from respective ones of said multipliers, outputs connected to respective ones of said shift registers, and second inputs connected to receive accumulated data from adjacent ones of said shift registers, said adders and shift registers being connected together in a chain in which each adder combines a multiplier product with a cumulative sum derived from an adjacent adder in the chain, and the final adder in the chain produces a sucession of N accumulated product summations proportional to the discrete values of the convolution of the first and second functions.

2. A monolithic discrete-time digital convolution circuit as set forth in claim 1, wherein:
each of said adders produces a partial sum and a set of carry digits for storage in a corresponding one of said shift registers; and
said convolution circuit further includes a high-speed adder coupled to the final shift register in the chain to add the partial sum and carry digits stored in it.

3. A monolithic discrete-time digital convolution circuit as set forth in claim 1, and further comprising:
an input storage buffer coupled to said plurality of storage circuits, said input storage buffer being loadable independently of processing of the first-function values in said storage circuits.

4. A monolithic discrete-time digital convolution circuit as set forth in claim 3, wherein said input storage buffer is loadable in serial fashion to reduce the number of input-output pins required.

5. A monolithic discrete-time digital convolution circuit as set forth in claim 1, wherein said convolver circuit is constructed in the form of N repeated stages, each having one of said storage circuits, one of said multipliers, one of said adders, and one of said shift registers, to facilitate implementation of the circuit in monolithic form by providing a regular, repeating circuit pattern.

6. A monolithic discrete-time digital convolution circuit as set forth in claim 1, wherein:
each of said multipliers employs a hybrid encoding scheme for the first-function values, to maximize speed of multiplication.

7. A monolithic discrete-time digital convolution circuit as set forth in claim 6, wherein:
said hybrid encoding scheme uses one digit to indicate whether a value has a magnitude of two, one digit to indicate the sign of the value, and one digit to indicate if the value is zero; and
each of said multipliers includes a first stage for multiplying by two, a second stage complementing to effect sign reversal, and a third stage to substitute a zero value.

8. A monolithic discrete-time digital convolution circuit, comprising:
a plurality of repeated stages, each stage including
a storage register for holding a value of a first function,
a multiplier connected to receive one input from said first storage register,
an adder connected to receive one input from said multiplier, and
a shift register connected to receive output from said adder;
first input circuit means, for loading N values of the first function into said first storage registers;
second input circuit means, for supplying N successive values of a second function as a second input to said multipliers;
means for connecting said shift registers and said adders in a connected string such that each shift register except the last one in the string is coupled as an input to the adder in an adjacent repeated stage; and
timing means for synchronizing operation of said multipliers, adders and shift registers, wherein successive sets of products of the first and second functions are accumulated by operation of said adders and shift registers, to produce a succession of product sums equivalent to discrete values of the convolution of the first and second functions.

9. A monolithic discrete-time digital convolution circuit as set forth in claim 8, wherein:
each of said adders produces a partial sum and a set of carry digits for storage in a corresponding one of said shift registers; and
said convolution circuit further includes a high-speed adder coupled to the final shift register in the chain to add the partial sum and carry digits stored in it.

10. A monolithic discrete-time digital convolution circuit as set forth in claim 9, wherein:
said high-speed adder is a conditional sum adder.

11. A monolithic discrete-time digital convolution circuit as set forth in claim 9, wherein:
each of said shift registers is incorporated into the logic of a corresponding one of said adders.

12. A monolithic discrete-time digital convolution circuit as set forth in claim 11, wherein:
each of said adders includes a plurality of one-bit adder modules, each having one sum input line for input of a sum bit from a prior-stage adder, one carry input line for input of a carry bit from a prior-stage adder, one multiplier result input line for input of a result bit from one of said multipliers, and one sum output line and one carry output line to provide a two-bit sum of the three input bits.

13. A monolithic discrete-time digital convolution circuit as set forth in claim 8, and further comprising:
an input storage buffer coupled to said plurality of storage circuits, said input storage buffer being loadable independently of processing of the first-function values in said storage circuits.

14. A monolithic discrete-time digital convolution circuit as set forth in claim 13, wherein said input storage buffer is loadable in serial fashion to reduce the number of input/output pins required.

15. A monolithic discrete-time digital convolution circuit as set forth in claim 8, wherein:
each of said multipliers employs a hybrid encoding scheme for the first-function values, to maximize speed of multiplication.

16. A monolithic discrete-time digital convolution circuit as set forth in claim 15, wherein:
said hybrid encoding scheme uses one digit to indicate whether a value has a magnitude of two, one digit to indicate the sign of the value, and one digit to indicate if the value is zero; and
each of said multipliers includes a first stage for multiplying by two, a second stage for complementing to effect sign reversal, and a third stage to substitute a zero value.

* * * * *